United States Patent
Zou et al.

(10) Patent No.: US 10,930,023 B2
(45) Date of Patent: Feb. 23, 2021

(54) METHOD AND APPARATUS FOR IMITATING ORIGINAL GRAPHIC, COMPUTING DEVICE, AND STORAGE MEDIUM

(71) Applicant: BOE TECHNOLOGY GROUP CO., LTD., Beijing (CN)

(72) Inventors: Xiangxiang Zou, Beijing (CN); Hongtao Guan, Beijing (CN); Lu Tong, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/448,103

(22) Filed: Jun. 21, 2019

(65) Prior Publication Data
US 2020/0013197 A1    Jan. 9, 2020

(30) Foreign Application Priority Data
Jul. 3, 2018    (CN) .......................... 201810717798.X (51) Int. Cl.
*G06T 11/00* (2006.01)
*G06F 3/0354* (2013.01)
*G06F 3/0488* (2013.01)
*G06T 11/20* (2006.01)

(52) U.S. Cl.
CPC ........ *G06T 11/001* (2013.01); *G06F 3/03547* (2013.01); *G06F 3/04883* (2013.01); *G06T 11/20* (2013.01)

(58) Field of Classification Search
CPC ... G06T 11/20; G06F 3/03547; G06F 3/04883
See application file for complete search history.

(56) References Cited

U.S. PATENT DOCUMENTS

| | | | | |
|---|---|---|---|---|
| 5,123,087 A | * | 6/1992 | Newell | G06F 3/04812 345/619 |
| 2013/0251264 A1 | * | 9/2013 | Forcke | G06K 9/6201 382/187 |
| 2018/0096623 A1 | * | 4/2018 | Xia | G06F 3/04883 |

FOREIGN PATENT DOCUMENTS

CN      107016902 A      8/2017

* cited by examiner

Primary Examiner — Kent W Chang
Assistant Examiner — Chayce R Bibbee
(74) *Attorney, Agent, or Firm* — Calfee, Halter & Griswold LLP (57) ABSTRACT

A method of and system for: acquiring drawing technique prompt information associated with an original graphic; initiating presentation of a stroke represented by the touch input on a display screen in response to detecting touch input on a touch pad; initiating presentation of a first prompt of the plurality of prompts in association with the stroke on the display screen; and initiating recording of graphic data corresponding to the stroke as an imitation of the first portion in response to completion of imitating a first portion.

18 Claims, 6 Drawing Sheets

METHOD AND APPARATUS FOR IMITATING ORIGINAL GRAPHIC, COMPUTING DEVICE, AND STORAGE MEDIUM

CROSS-REFERENCE TO RELATED APPLICATIONS

The present application claims the benefit of Chinese Patent Application No. 201810717798.X, filed on Jul. 3, 2018, the entire disclosure of which is incorporated herein by reference.

TECHNICAL FIELD

The present disclosure relates to the field of human-machine interaction technology, and in particular to a computer-implemented method of imitating an original graphic, a device for imitating an original graphic, a computing device, and a storage medium.

BACKGROUND

Imitating an original work is a way to learn how to draw or paint. Some dedicated devices are available on the market that assist a user in learning imitation. However, these dedicated devices require additional hardware components, such as cameras, to capture the user's actions for analysis. This may require involvement of professionals. Moreover, these dedicated devices tend to provide limited feedback to the user, affecting the user experience.

SUMMARY

According to some exemplary embodiments, a computer-implemented method of imitating an original graphic is provided. The method comprises: acquiring drawing technique prompt information associated with the original graphic, wherein the drawing technique prompt information comprises a plurality of prompts regarding respective drawing techniques for respective different portions of the original graphic and specifies an order in which the respective different portions should be imitated; responsive to detecting touch input on a touch pad, initiating presentation of a stroke represented by the touch input on a display screen; initiating presentation of a first prompt of the plurality of prompts in association with the stroke on the display screen, wherein the first prompt prompts the drawing technique for a first portion of the respective different portions that should be initially imitated according to the specified order; and responsive to completion of imitating the first portion, initiating recording of graphic data corresponding to the stroke as an imitation of the first portion.

In some exemplary embodiments, the method further comprises: after the completion of imitating the first portion, performing imitating operations for remaining portions of the respective different portions in the specified order. The imitating operations comprise: responsive to detecting subsequent touch input on the touch pad, initiating presentation of a subsequent stroke represented by the subsequent touch input on the display screen; initiating presentation of a subsequent prompt of the plurality of prompts in association with the subsequent stroke on the display screen, wherein the subsequent prompt prompts the drawing technique for a subsequent portion of the remaining portions that should currently be imitated according to the specified order; and responsive to completion of imitating the subsequent portion, initiating recording of graphic data corresponding to the subsequent stroke as an imitation of the subsequent portion.

In some exemplary embodiments, the method further comprises initiating presentation of the original graphic in a thumbnail window on the display screen.

In some exemplary embodiments, the method further comprises initiating highlighting, in the original graphic presented in the thumbnail window, of a portion of the respective different portions that should currently be imitated.

In some exemplary embodiments, the method further comprises initiating, in the thumbnail window, real-time presentation of a thumbnail representation of the imitation, side by side with the original graphic, that has currently been drawn.

In some exemplary embodiments, the method further comprises: responsive to completion of an imitation of all of the respective different portions of the original graphic, initiating enlargement of the thumbnail window to present in an enlarged thumbnail window the imitation of the original graphic side by side with the original graphic.

In some exemplary embodiments, the method further comprises: responsive to detecting that a cursor focus of current touch input is located at an intersection of a plurality of strokes that have been presented, initiating presentation of respective ones of the plurality of prompts regarding the plurality of strokes.

In some exemplary embodiments, the method further comprises, responsive to completion of an imitation of a corresponding portion of the respective different portions: evaluating a corresponding degree of difference between the imitation of the corresponding portion that has been recorded and the corresponding portion of the original graphic based on a difference metric; and responsive to the corresponding degree of difference being greater than a threshold, initiating presentation of a user option on the display screen, wherein the user option comprises re-imitating and continuing imitating.

In some exemplary embodiments, the method further comprises, responsive to a user selection of the re-imitating: initiating erasing of the imitation of the corresponding portion that has been presented on the display screen; initiating deletion of graphic data of the imitation of the corresponding portion that has been recorded; and re-performing imitating operation for the corresponding portion.

In some exemplary embodiments, the method further comprises: responsive to a user selection of the continuing imitating, proceeding to perform the imitating operations for the remaining portions of the respective different portions according to the specified order.

In some exemplary embodiments, the method further comprises initiating visual presentation of the corresponding degree of difference using a graphical element.

In some exemplary embodiments, the method further comprises, responsive to completion of an imitation of all of the respective different portions of the original graphic: evaluating a total degree of difference between the imitation of the original graphic and the original graphic based on a difference metric; and initiating visual presentation of the total degree of difference using a graphical element.

In some exemplary embodiments, the graphical element comprises at least one selected from a group consisting of a text, a number, an icon, a symbol, a logo, and an animation.

According to some exemplary embodiments, a computing device is provided, comprising a touch pad, a display screen, at least one processor, and a memory operably connected to the at least one processor. The memory is configured to store instructions that, when executed by the at least one processor, cause the at least one processor to perform operations comprising: acquiring drawing technique prompt information associated with an original graphic, wherein the drawing technique prompt information comprises a plurality of prompts regarding respective drawing techniques for respective different portions of the original graphic and specifies an order in which the respective different portions should be imitated; responsive to detecting touch input on a touch pad, initiating presentation of a stroke represented by the touch input on a display screen; initiating presentation of a first prompt of the plurality of prompts in association with the stroke on the display screen, wherein the first prompt prompts the drawing technique for a first portion of the respective different portions that should be initially imitated according to the specified order; and responsive to completion of imitating the first portion, initiating recording of graphic data corresponding to the stroke as an imitation of the first portion.

In some exemplary embodiments, the touch pad and the display screen are integrated as a touch display.

According to some exemplary embodiments, a computer readable storage medium is provided having stored thereon instructions that, when executed by a computer, cause the computer to perform the method as described above.

According to some exemplary embodiments, a device is provided for imitating an original graphic, comprising: means for acquiring drawing technique prompt information associated with the original graphic, wherein the drawing technique prompt information comprises a plurality of prompts regarding respective drawing techniques for respective different portions of the original graphic and specifies an order in which the respective different portions should be imitated; means for presenting a stroke represented by touch input on a display screen in response to detecting the touch input on a touch pad; means for presenting a first prompt of the plurality of prompts in association with the stroke on the display screen, wherein the first prompt prompts the drawing technique for a first portion of the respective different portions that should be initially imitated according to the specified order; and means for recording graphic data corresponding to the stroke as an imitation of the first portion in response to completion of imitating the first portion.

DETAILED DESCRIPTION

In order to render the objectives, technical solutions and advantages of the present disclosure more apparent, exemplary embodiments are described in detail below with reference to the accompanying drawings.

It will be understood that, although the terms first, second, third etc. may be used herein to describe various elements, components and/or sections, these elements, components and/or sections should not be limited by these terms. These terms are only used to distinguish one element, component or section from another. Thus, a first element, component or section discussed below could be termed a second element, component or section without departing from the teachings of the present disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Any two elements herein combined to achieve a particular functionality may be seen as "associated with" each other such that the desired functionality is achieved. Likewise, any two devices so associated can also be viewed as being "operably connected" or "operably coupled" to each other to achieve the desired functionality.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1:
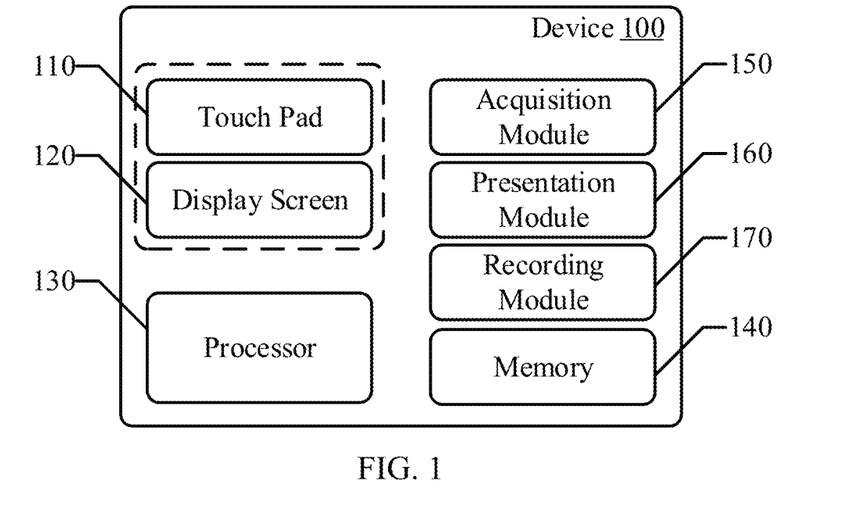
FIG. 1 illustrates a schematic block diagram of an apparatus for imitating an original graphic in accordance with an exemplary embodiment.

FIG. 1 illustrates a schematic block diagram of a device 100 for imitating an original graphic in accordance with an exemplary embodiment.

Referring to FIG. 1, the device 100 includes a touch pad 110, a display screen 120, a processor 130, a memory 140, an acquisition module 150, a presentation module 160, and a recording module 170.

The touch pad 110 acts as an input interface of the device 100 and is configured to receive touch input provided by a user via, for example, a finger or a stylus. In the application of imitating an original graphic, the touch input represents a stroke made by the user during the imitating process.

The display screen 120 acts as an output interface of the device 100 and is configured to present a user interface that includes elements such as windows, icons, buttons, and the like. In the application of imitating an original graphic, the display screen 120 may present the stroke represented by the touch input provided by the user. Although the display screen 120 is shown in FIG. 1 as being separate from the touch pad 110, this is not restrictive. In some exemplary embodiments, the touch pad 110 and the display screen 120 may be integrated as a touch display.

The processor 130 is configured to control various operations of the device 100, such as graphics processing. The processor 130 may include a central processing unit (CPU) and one or more co-processors (e.g., one or more graphic processing units (GPUs)). The processor 130 may also include multiple parallel processor cores. The processor 130 may be implemented using a variety of architectures. In some exemplary embodiments, the device 100 may include one or more processors 130.

The memory 140 is configured to store various programs and data. The memory 140 may include a volatile memory and a non-volatile memory. In the application of imitating an original graphic, the memory 140 may record graphic data corresponding to the strokes made by the user, including, for example, track coordinates, line thickness, color, and the like. The memory 140 may also store original graphics and drawing technique prompt information associated with the original graphics.

The term original graphic as used herein refers to a graphic that is to be imitated by the user and which should be broadly understood to include various graphics (e.g., lines, characters, letters, or a combination thereof), drawings and paintings, whether they are in monochrome or in color. The original graphic can be divided into a plurality of different portions, such as different lines or different regions, and can be accessed individually from the memory 140 in terms of the plurality of different portions.

The drawing technique prompt information includes a plurality of prompts regarding respective drawing techniques for the respective different portions of the original graphic. These prompts are used to prompt the user of a drawing technique for an original graphic portion that should currently be imitated, such as information on how to run the pen or how to select a color. Additionally, the drawing technique prompt information specifies the order in which the respective different portions of the original graphic should be imitated. The user is expected to imitate these different portions in that order.

The acquisition module 150 is configured to acquire the drawing technique prompt information associated with the original graphic. In some exemplary embodiments, the acquisition module 150 retrieves the drawing technique prompt information from a non-volatile memory device of the memory 140 and temporarily stores it in a random access memory device of the memory 140 for instant access.

The presentation module 160 is configured to present the stroke represented by the touch input on the display screen 120 in response to detecting the touch input on the touch pad 110. In some exemplary embodiments, the presentation module 160 receives touch detection data representing the touch input from the touch pad 110, converts the touch detection data into graphical data, such as in RGB format, and transmits the graphical data to the display screen 120 for stroke presentation. The presentation module 160 is further configured to present a corresponding one of the plurality of prompts in the drawing technique prompt information on the display screen 120 in association with the stroke.

The recording module 170 is configured to, responsive to completion of imitating each portion of the original graphic, record graphic data corresponding to the stroke as an imitation of the portion. In some exemplary embodiments, the recording module 170 records the graphic data in a non-volatile storage device of the memory 140 for long term storage.

It will be understood that various techniques are described herein in the general context of a software hardware component or program module. In general, the acquisition module 150, the presentation module 160, and the recording module 170 include routines, programs, objects, elements, components, data structures, and the like that perform particular tasks or implement particular abstract data types.

More generally, the terms "module," "function," and "component" as used herein may mean software, firmware, hardware, or a combination thereof. The features of the techniques described herein are platform-independent, meaning that these techniques can be implemented on a variety of computing platforms having a variety of processors.

Figure 2A:
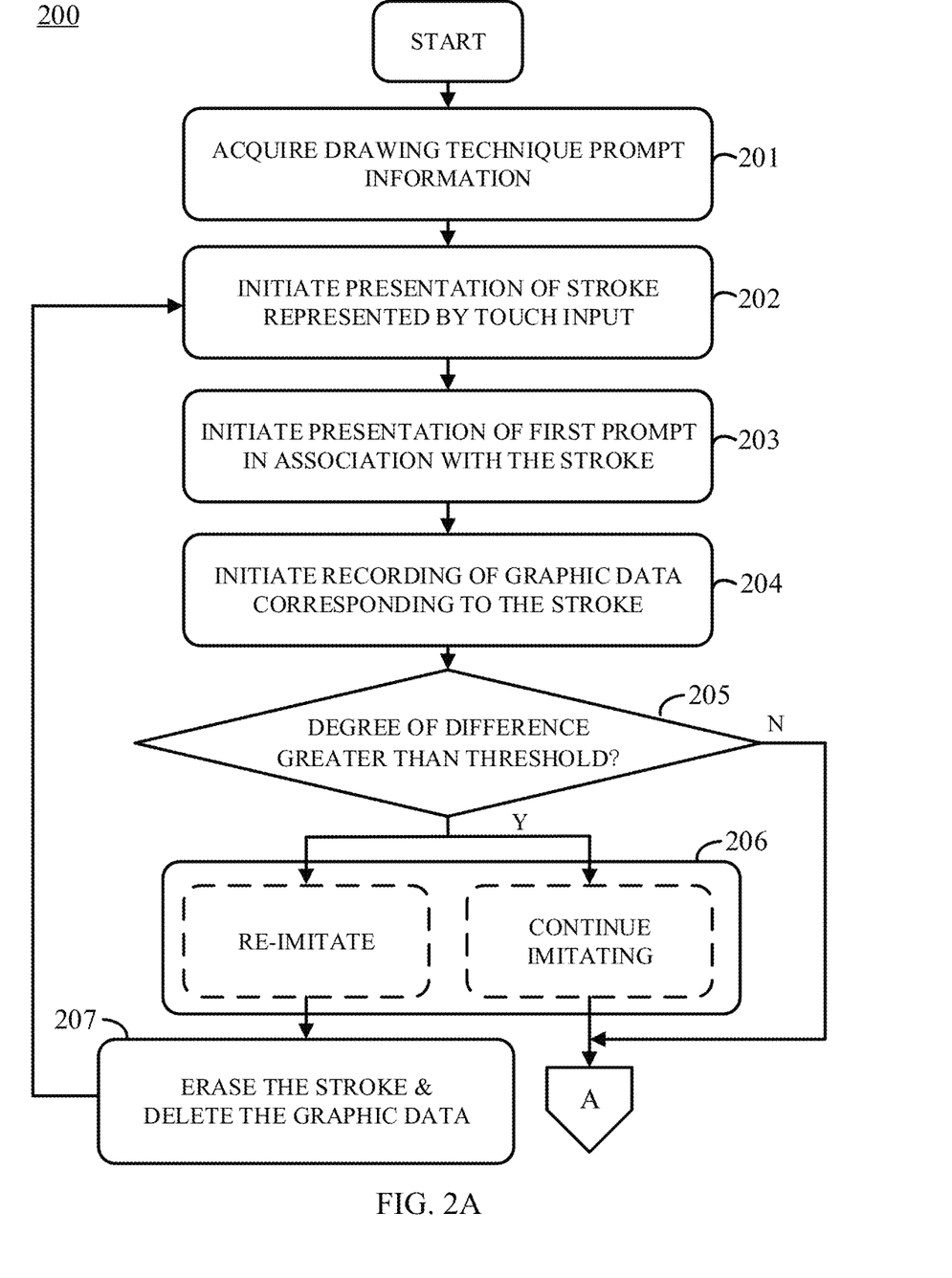
FIGS. 2A and 2B illustrate a flow chart of a method of imitating an original graphic in accordance with an exemplary embodiment.
Figure 2B:
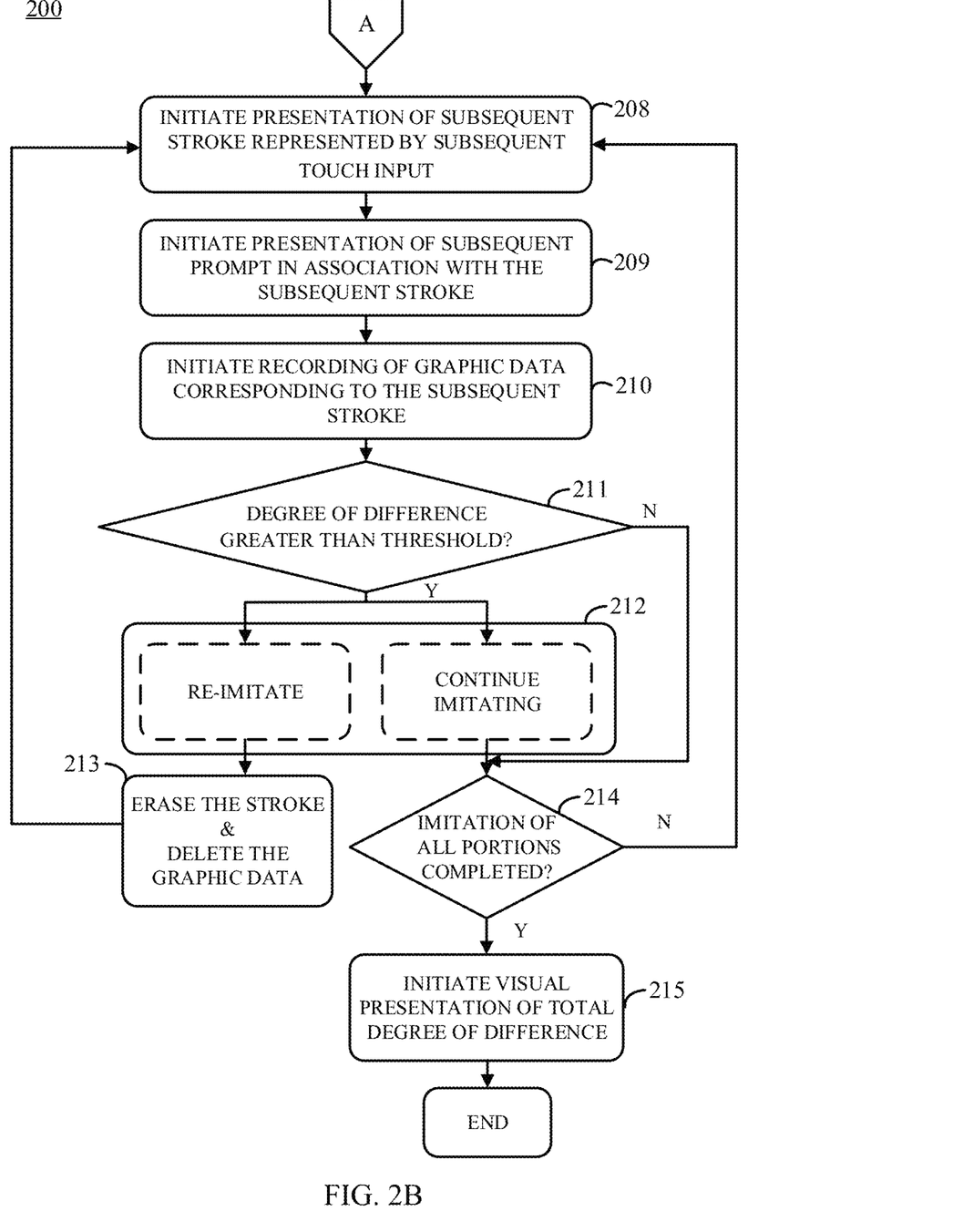

FIGS. 2A and 2B illustrate a flow chart of a method 200 of imitating an original graphic in accordance with an exemplary embodiment. The method 200 can be performed on the device 100 of FIG. 1 and may, for example, start with a user pressing a button of "Start Imitating" in the user interface presented on the display screen 120.

Referring to FIG. 2A, at step 201, the drawing technique prompt information associated with the original graphic is acquired. This can be achieved by the acquisition module 150 as described above.

At step 202, responsive to detecting touch input on the touch pad 110, presentation of a stroke represented by the touch input is initiated on the display screen 120. This can be achieved by the presentation module 160 as described above. The phrase "initiating an action" as used herein is intended to describe from the perspective of a program that hardware is driven by the program to perform the action. For example, the presentation module 160 may be implemented as a program that, when executed by the processor 130, controls the display screen 120 to implement functions related to presentation.

At step 203, the presentation module 160 initiates presentation of a first prompt of the plurality of prompts in the drawing technique prompt information on the display screen 120 in association with the stroke. The first prompt prompts a drawing technique for the first portion that should be imitated at the very beginning among the respective different portions of the original graphic according to the order specified in the drawing technique prompt information.

Figure 3:
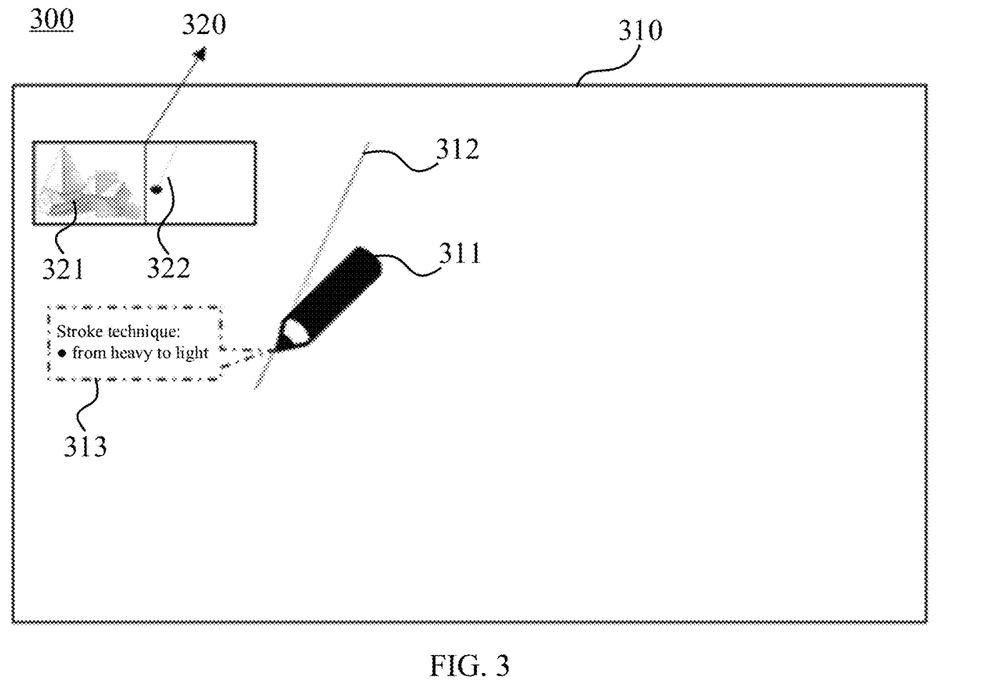
FIG. 3 illustrates an example user interface presented during a process of imitating an original graphic in accordance with an exemplary embodiment.

FIG. 3 illustrates an example user interface 300 presented during the process of imitating the original graphic. Referring to FIG. 3, the user makes a first stroke 312 in a main window 310, which is the result of imitating the first portion of an original graphic 321. In this example, a cursor 311 in the form of a pencil is presented in the main window 310 to allow the user to intuitively know where the cursor focus is currently located. A first prompt 313 is presented in association with the first stroke 312 to guide the user to perform the imitation in a correct manner. In this example, the first prompt 313 is presented near the tip of the pencil cursor 311, although this is not necessary. In other exemplary embodiments, the first prompt 313 may be positioned at other locations in the main window 310 relative to the first stroke 312.

Figure 4A:
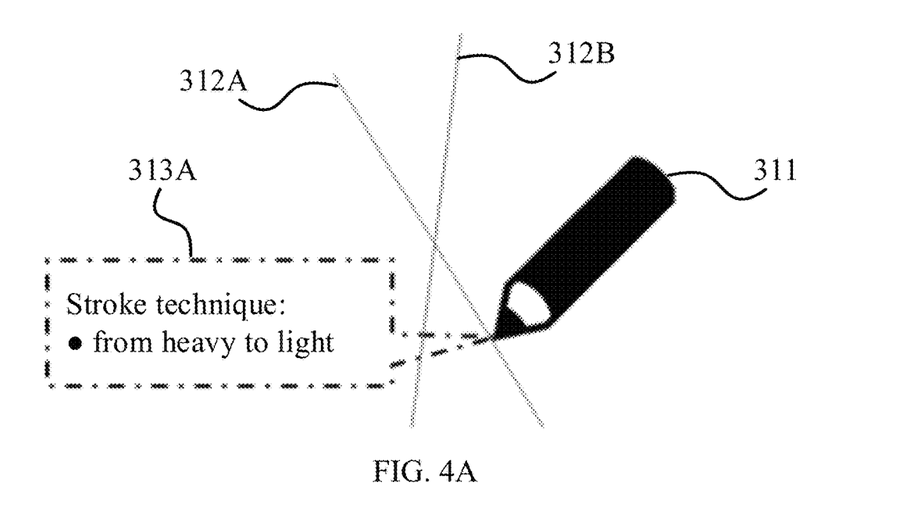
FIGS. 4A and 4B illustrate in enlarged views how prompt information is presented in a user interface according to an exemplary embodiment.
Figure 4B:
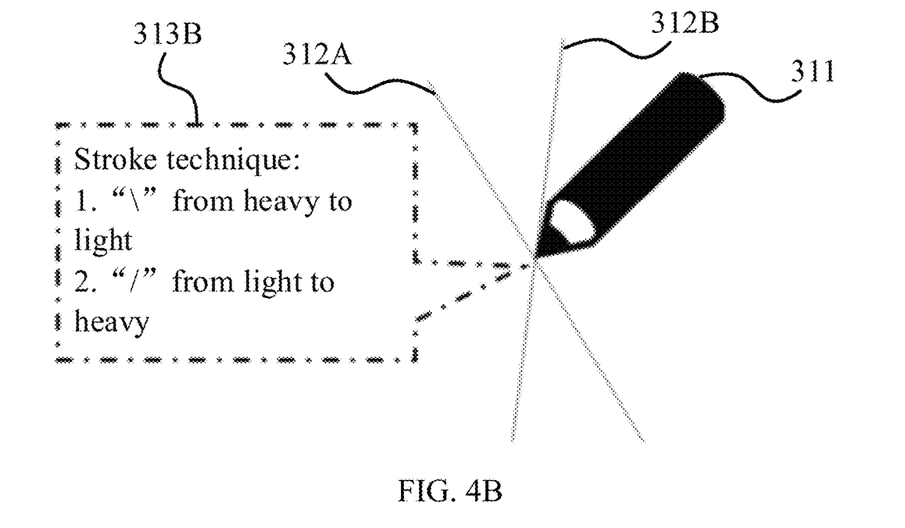

FIGS. 4A and 4B illustrate in enlarged views how the prompt information is presented in the user interface 300. In the example of FIG. 4A, the cursor 311 in the form of a pencil is located on one of two strokes 312A and 312B that intersect each other, and a prompt 313A is presented in association with the stroke 312A, prompting the user that the line 312A should be imitated with a technique of "from heavy to light". In the example of FIG. 4B, the cursor 311 in the form of a pencil is located at the intersection of the two strokes 312A and 312B that intersect each other, and a prompt 313B is presented in association with the strokes 312A and 312B, prompting the user that (1) the stroke 312A should be imitated with a technique of "from heavy to light"; and that (2) the stroke 312B should be imitated with a technique of "from light to heavy". In particular, the slash and the backslash in the prompt 313B represent the orientations of respective ones of the strokes 312A and 312B.

It will be understood that the prompts are not limited to the form of the text, but may be in any suitable form, such as animation, audio, and the like. It will also be appreciated that the cursor 311 may be optional, for example where the touch pad 110 and the display screen 120 are integrated as a touch display, since the touch operation is performed on the touch display in a "what you see is what you get" manner, and therefore the user does not need to know where the cursor focus is currently located.

Referring back to FIG. 3, a thumbnail window 320 is also shown, in which an original graphic 321 is presented. In some exemplary embodiments, the presentation module 160 initiates highlighting, in the original graphic 321 presented in the thumbnail window 320, of a portion of the respective different portions of the original graphic 321 that should currently be imitated. As previously mentioned, the different portions of the original graphic 321 can be accessed individually from the memory 140 and thus can be presented differently from each other on the display screen 120. In one example, the portion that should currently be imitated is presented normally, while the remaining portions are presented in monochrome and/or in reduced brightness. This prompts the user in an intuitive way which one of the portions of the original graphic 321 should be currently drawn.

In some exemplary embodiments, the presentation module 160 initiates, in the thumbnail window 320, real-time presentation of a thumbnail representation 322 of the imitation that has currently been drawn, side by side with the original graphic 321. In the example of FIG. 3, the stroke 312 that has currently been drawn in the main window 310 is presented in the thumbnail window 320 in real time. In this way, the user can know the progress of the imitation. In this example, the original graphic 321 and the thumbnail representation 322 are presented in a left-right arrangement, but this is not restrictive. In other exemplary embodiments, the original graphic 321 and the thumbnail representation 322 may be presented, for example, in an up-down arrangement.

Referring back to FIG. 2A, at step 204, responsive to completion of imitating the first portion, recording is initiated of the graphic data corresponding to the stroke as an imitation of the first portion. This can be achieved by the recording module 170 as described above. For example, the recording module 170 may be implemented as a program that, when executed by the processor 130, controls the memory 140 to implement functions related to recording.

In some exemplary embodiments, the completion of the imitation of the first portion may be explicitly notified to the device 100 by the user, such as by pressing a button of "Submit" (not shown) in the user interface 300. In some exemplary embodiments, the completion of the imitation of the first portion may be implicitly inferred by device 100. For example, the device 100 allocates an area for imitating in the main window 310 (FIG. 3) and divides the area into a plurality of sub-areas of m rows and n columns, with each sub-region corresponding to a respective one of the portions of the original graphic. When it is detected that the stroke made by the user falls outside the first sub-area, the device 100 infers that the imitation of the first portion of the original graphic 321 corresponding to the first sub-area has been completed, and so on.

With continued reference to FIG. 2A, at step 205, a degree of difference between the imitation of the first portion that has been recorded in step 204 and the first portion of the original graphic 321 is evaluated based on a difference metric. In some exemplary embodiments, the difference metric may include, for example, a difference in color, line thickness, and included angle between lines.

In some exemplary embodiments, at step 205, the degree of difference is visually presented using a graphical element. By way of example and not limitation, the graphical element includes at least one selected from the group consisting of a text, a number, an icon, a symbol, a logo, and an animation. In one example, a score representing the degree of difference may be presented on the display screen 120, where the smaller the degree of difference, the higher the score. In another example, a facial expression icon representing the degree of difference may be presented on the display screen 120, where a smiley face indicates a small degree of difference, and a crying face indicates a large degree of difference.

At step 206, responsive to the degree of difference being greater than a threshold, the presentation module 160 initiates presentation of a user option on the display screen 120, where the user option includes re-imitating and continuing imitating. For example, two buttons "Re-imitate" and "Continue Imitating" may be presented.

If the user selects "Re-imitate", the presentation module 160 initiates erasing of the imitation of the first portion that has been presented on the display screen 120, and the recording module 170 initiates deletion of the graphic data of the imitation of the first portion that has been recorded in the memory 140 (step 207). The method 200 then returns to step 202 to re-perform the imitating operation for the first portion. If the user selects "Continue Imitating", the imitating operations for the remaining portions of the original graphic 321 are continued in the order specified in the drawing technique prompt information.

Referring now to FIG. 2B, after the imitation of the first portion of the original graphic 321 is completed, the imitating operations for the remaining portions of the original graphic 321 are performed in the order specified in the drawing technique prompt information.

At step 208, responsive to detecting subsequent touch input on the touch pad 110, the presentation module 160 initiates presentation of a subsequent stroke represented by the subsequent touch input on the display screen 110. This is similar to step 202 and will not be repeated here for the sake of brevity.

At step 209, the presentation module 160 initiates presentation of a subsequent prompt of the plurality of prompts in association with the subsequent stroke on the display screen 120, wherein the subsequent prompt prompts the drawing technique for a subsequent portion of the remaining portions that should currently be imitated according to the specified order. This is similar to step 203 and will not be repeated here for the sake of brevity.

At step 210, responsive to completion of imitating the subsequent portion, the recording module 170 initiates recording of the graphic data corresponding to the subsequent stroke as an imitation of the subsequent portion. This is similar to step 204 and will not be repeated here for the sake of brevity.

At step 211, a degree of difference between the imitation of the subsequent portion that has been recorded in step 210 and the subsequent portion of the original graphic 321 is evaluated based on the difference metric. This is similar to step 205 and will not be repeated here for the sake of brevity.

At step 212, responsive to the degree of difference being greater than a threshold, the presentation module 160 initiates presentation of a user option on the display screen 120, where the user option includes re-imitating and continuing imitating. For example, two buttons "Re-imitate" and "Continue Imitating" may be presented.

If the user selects "Re-imitate", the presentation module 160 initiates erasing of the imitation of the subsequent portion that has been presented on the display screen 120, and the recording module 170 initiates deletion of the graphic data of the imitation of the subsequent portion that has been recorded in the memory 140 (step 213). The method 200 then returns to step 208 to re-perform the imitating operation for the subsequent portion. If the user selects "Continue Imitating", the imitating operations for the remaining portions of the original graphic 321 are continued according to the order specified in the drawing technique prompt information.

At step 214, it is determined whether the imitation of all of the respective different portions of the original graphic 321 has been completed. In some exemplary embodiments, this can be achieved simply by comparing the number of the portions that have been completed to the number of the different portions of the original graphic 321. For example, each time the user completes an imitation of a corresponding portion, he or she presses the "Submit" button (not shown) on the user interface 300, and then the number of the completed portions is incremented by 1 and compared with the number of the different portions of the original graphic 321. If the two are not equal, it indicates that the imitation of the original graphic 321 has not been completed, and the method 200 returns to step 208 to perform the imitation operation for the next portion. Otherwise, it is indicated that the imitation of all of the respective different portions of the original graphic 321 has been completed, and the method 200 proceeds to step 215.

At step 215, a total degree of difference between the imitation 322 of the original graphic and the original graphic 321 is evaluated based on a difference metric, and the total degree of difference is visually presented using a graphical element. As mentioned previously, examples of such a graphical element include, but are not limited to, a text, a number, an icon, a symbol, a logo, and/or an animation.

Figure 5:
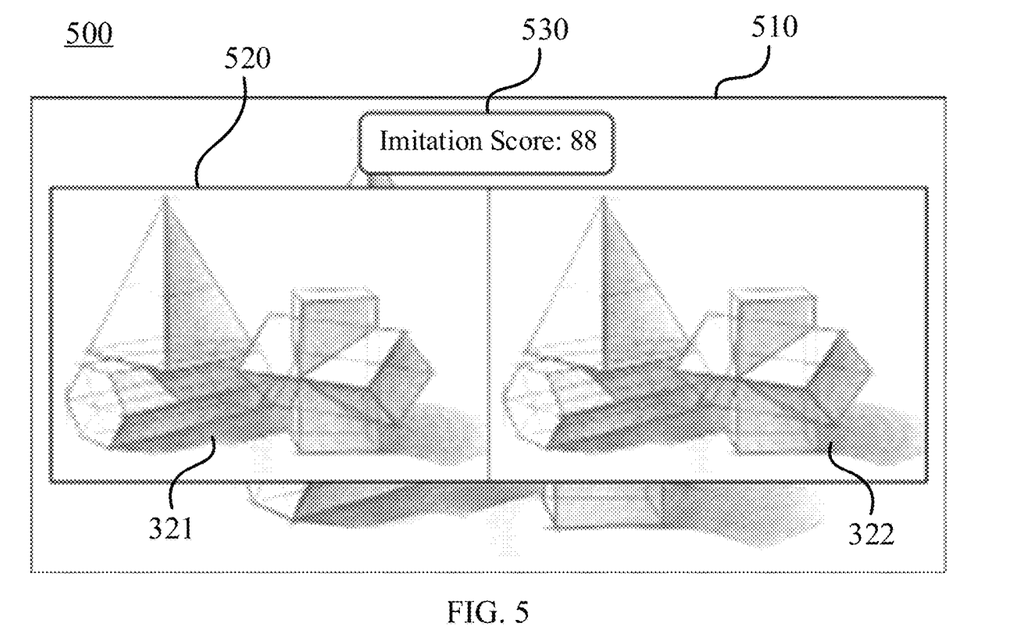
FIG. 5 illustrates an example user interface presented at the end of a process of imitating an original graphic in accordance with an exemplary embodiment.

FIG. 5 illustrates an example user interface 500 presented at the end of the process of imitating the original graphic. Referring to FIG. 5, the user interface 500 includes a main window 510, an enlarged thumbnail window 520, and a text box 530 as the graphic element. The main window 510 is the main window 310 in the user interface 300 shown in FIG. 3, within which the user performs the imitation of the original graphic 321. When the imitation of all of the respective different portions of the original graphic 321 has been completed, the thumbnail window 320 in the user interface 300 is enlarged and is now presented as the enlarged thumbnail window 520 in which both the original graphic 321 and the imitation 322 of the original graphic is presented side by side. The text box 530 as the graphical element presents a total score of the imitation 322, indicating the degree of difference between the imitation 322 and the original graphic 321 (the higher the score, the smaller the difference).

Figure 6:
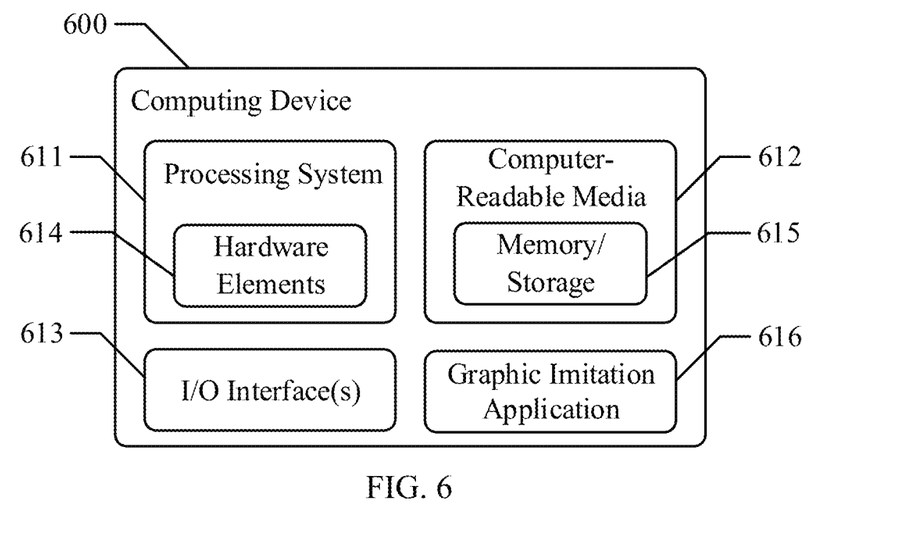
FIG. 6 illustrates a schematic block diagram of an example computing device that can implement various techniques described herein.

FIG. 6 illustrates a schematic block diagram of an example computing device 600 that can implement the various techniques described herein.

The computing device 600 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, watch), an entertainment device (e.g., an entertainment appliance, a set-top box communicatively coupled to a display device, a game console), a television or other display device, an automotive computer, and so forth. Thus, the computing device 600 may range from a full resource device with substantial memory and processor resources (e.g., personal computers, game consoles) to a low-resource device with limited memory and/or processing resources (e.g., traditional set-top boxes, hand-held game consoles).

The example computing device 600 as illustrated includes a processing system 611, one or more computer-readable media 612, and one or more I/O Interfaces 613 that are communicatively coupled, one to another. Although not shown, the computing device 600 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 611 is representative of functionality to perform one or more operations using hardware. Accordingly, the processing system 611 is illustrated as including hardware elements 614 that may be configured as processors, functional blocks, and so forth. This may include implementation in hardware as an application specific integrated circuit or other logic device formed using one or more semiconductors. The hardware elements 614 are not limited by the materials from which they are formed or the processing mechanisms employed therein. For example, processors may be comprised of semiconductor(s) and/or transistors (e.g., electronic integrated circuits (ICs). In such a context, processor-executable instructions may be electronically-executable instructions.

The computer-readable media 612 is illustrated as including memory/storage 615. The memory/storage 615 represents memory/storage capacity associated with one or more computer-readable media. The memory/storage 615 may include volatile media (such as random access memory (RAM)) and/or nonvolatile media (such as read only memory (ROM), Flash memory, optical disks, magnetic disks, and so forth). The memory/storage 615 may include fixed media (e.g., RAM, ROM, a fixed hard drive, and so on) as well as removable media (e.g., Flash memory, a removable hard drive, an optical disc, and so forth). The computer-readable media 612 may be configured in a variety of other ways as further described below.

The one or more input/output interface(s) 613 are representative of functionality to allow a user to enter commands and information to computing device 600, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 600 may be configured in a variety of ways as further described below to support user interaction.

The computing device 600 further includes a graphic imitation application 616. The graphic imitation application 616 embodies the acquisition module 150, the presentation module 160 and the recording module 170 that are described above with respect to FIGS. 1 to 5. The graphic imitation application 616 may be stored in the memory/storage 615 as computer program instructions, which together with the processing system 611, the computer-readable media 612 and the input/output interface(s) 613 implement all of the functionality of the device 100 described with respect to FIG. 1.

An implementation of the described modules and techniques may be stored on or transmitted across some form of computer-readable media. The computer-readable media may include a variety of media that may be accessed by the computing device 600. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 600, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 614 and computer-readable media 612 are representative of instructions, modules, programmable device logic and/or fixed device logic implemented in a hardware form that may be employed in some exemplary embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 614. The computing device 600 may be configured to implement particular instructions and/or functions corresponding to the software and/or hardware modules. Accordingly, implementation of modules as a module that is executable by the computing device 600 as software may be achieved at least partially in hardware, e.g., through use of computer-readable storage media and/or hardware elements 614 of the processing system. The instructions and/or functions may be executable/operable by one or more articles of manufacture (for example, one or more computing devices 600 and/or processing systems 611) to implement techniques, modules, and examples described herein.

The techniques described herein may be supported by these various configurations of the computing device 600 and are not limited to the specific examples of the techniques described herein. It is to be appreciated and understood that each exemplary embodiment described herein can be used on its own or in connection with one or more other exemplary embodiments described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While operations are depicted in the drawings in a particular order, this should not be understood as requiring that such operations are to be performed in the particular order shown or in a sequential order, or that all illustrated operations are to be performed to achieve desirable results. In certain circumstances, multitasking and parallel processing may be advantageous. Moreover, the separation of various system components in the exemplary embodiments described above should not be understood as requiring such separation in all embodiments, and it should be understood that the described program components and systems can generally be integrated together in a single software product or packaged into multiple software products.

Variations to the disclosed exemplary embodiments can be understood and effected by the skilled person in practicing the claimed subject matter, from a study of the drawings, the disclosure, and the appended claims. In the claims, the word "comprises" or "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. A computer-implemented method of imitating an original graphic, comprising:
   acquiring drawing technique prompt information associated with the original graphic, wherein the drawing technique prompt information comprises a plurality of prompts regarding respective drawing techniques for respective different portions of the original graphic and specifies an order in which the respective different portions should be imitated;

responsive to detecting touch input on a touch pad, initiating presentation of a first stroke represented by the touch input on a display screen, the first stroke being a result of imitating a first portion of the respective different portions that should be initially imitated according to the specified order;

initiating presentation of a first prompt of the plurality of prompts in association with the first stroke on the display screen, wherein the first prompt prompts the drawing technique for the first portion; and responsive to completion of imitating the first portion, initiating recording of graphic data corresponding to the stroke as an imitation of the first portion.

2. The method of claim 1, further comprising:

after the completion of imitating the first portion, performing imitating operations for remaining portions of the respective different portions in the specified order, wherein the imitating operations comprise:

responsive to detecting subsequent touch input on the touch pad, initiating presentation of a subsequent stroke represented by the subsequent touch input on the display screen, the subsequent stroke being a result of imitating a subsequent portion of the remaining portions that should currently be imitated according to the specified order;

initiating presentation of a subsequent prompt of the plurality of prompts in association with the subsequent stroke on the display screen, wherein the subsequent prompt prompts the drawing technique for the subsequent portion; and responsive to completion of imitating the subsequent portion, initiating recording of graphic data corresponding to the subsequent stroke as an imitation of the subsequent portion.

3. The method of claim 1, further comprising initiating presentation of the original graphic in a thumbnail window on the display screen.

4. The method of claim 3, further comprising initiating highlighting, in the original graphic presented in the thumbnail window, of a portion of the respective different portions that should currently be imitated.

5. The method of claim 3, further comprising initiating, in the thumbnail window, real-time presentation of a thumbnail representation of the imitation, side by side with the original graphic, that has currently been drawn.

6. The method of claim 5, further comprising:

responsive to completion of an imitation of all of the respective different portions of the original graphic, initiating enlargement of the thumbnail window to present in an enlarged thumbnail window the imitation of the original graphic side by side with the original graphic.

7. The method of claim 1, further comprising:

responsive to detecting that a cursor focus of current touch input is located at an intersection of a plurality of strokes that have been presented, initiating presentation of respective ones of the plurality of prompts regarding the plurality of strokes.

8. The method of claim 2, further comprising, responsive to completion of an imitation of a corresponding portion of the respective different portions:

evaluating a corresponding degree of difference between the imitation of the corresponding portion that has been recorded and the corresponding portion of the original graphic based on a difference metric; and responsive to the corresponding degree of difference being greater than a threshold, initiating presentation of a user option on the display screen, wherein the user option comprises re-imitating and continuing imitating.

9. The method of claim 8, further comprising, responsive to a user selection of the re-imitating:

initiating erasing of the imitation of the corresponding portion that has been presented on the display screen;

initiating deletion of graphic data of the imitation of the corresponding portion that has been recorded; and re-performing imitating operation for the corresponding portion.

10. The method of claim 8, further comprising:

responsive to a user selection of the continuing imitating, proceeding to perform the imitating operations for the remaining portions of the respective different portions according to the specified order.

11. The method of claim 8, further comprising initiating visual presentation of the corresponding degree of difference using a graphical element.

12. The method of claim 2, further comprising, responsive to completion of an imitation of all of the respective different portions of the original graphic:

evaluating a total degree of difference between the imitation of the original graphic and the original graphic based on a difference metric; and initiating visual presentation of the total degree of difference using a graphical element.

13. The method of claim 12, wherein the graphical element comprises at least one selected from a group consisting of a text, a number, an icon, a symbol, a logo, and an animation.

14. A computing device, comprising:

a touch pad;

a display screen;

at least one processor; and a memory operably connected to the at least one processor, wherein the memory is configured to store instructions that, when executed by the at least one processor, cause the at least one processor to perform operations comprising:

acquiring drawing technique prompt information associated with an original graphic, wherein the drawing technique prompt information comprises a plurality of prompts regarding respective drawing techniques for respective different portions of the original graphic and specifies an order in which the respective different portions should be imitated;

responsive to detecting touch input on a touch pad, initiating presentation of a first stroke represented by the touch input on a display screen, the first stroke being a result of imitating a first portion of the respective different portions that should be initially imitated according to the specified order;

initiating presentation of a first prompt of the plurality of prompts in association with the first stroke on the display screen, wherein the first prompt prompts the drawing technique for the first portion; and responsive to completion of imitating the first portion, initiating recording of graphic data corresponding to the stroke as an imitation of the first portion.

15. The computing device of claim 14, wherein the touch pad and the display screen are integrated as a touch display.

16. A computer readable storage medium having stored thereon instructions that, when executed by a computer, cause the computer to perform the method of claim 1.

17. A device for imitating an original graphic, comprising:
means for acquiring drawing technique prompt information associated with the original graphic, wherein the drawing technique prompt information comprises a plurality of prompts regarding respective drawing techniques for respective different portions of the original graphic and specifies an order in which the respective different portions should be imitated;
means for presenting a first stroke represented by touch input on a display screen in response to detecting the touch input on a touch pad, the first stroke being a result of imitating a first portion of the respective different portions that should be initially imitated according to the specified order;
means for presenting a first prompt of the plurality of prompts in association with the first stroke on the display screen, wherein the first prompt prompts the drawing technique for the first portion; and
means for recording graphic data corresponding to the stroke as an imitation of the first portion in response to completion of imitating the first portion.

18. The computing device of claim 14, wherein the at least one processor is further caused to after the completion of imitating the first portion, perform imitating operations for remaining portions of the respective different portions in the specified order,
wherein the imitating operations comprise:
responsive to detecting subsequent touch input on the touch pad, initiating presentation of a subsequent stroke represented by the subsequent touch input on the display screen, the subsequent stroke being a result of imitating a subsequent portion of the remaining portions that should currently be imitated according to the specified order;
initiating presentation of a subsequent prompt of the plurality of prompts in association with the subsequent stroke on the display screen, wherein the subsequent prompt prompts the drawing technique for the subsequent portion; and
responsive to completion of imitating the subsequent portion, initiating recording of graphic data corresponding to the subsequent stroke as an imitation of the subsequent portion.

\* \* \* \* \*